(12) United States Patent
Cao et al.

(10) Patent No.: US 12,485,743 B2
(45) Date of Patent: Dec. 2, 2025

(54) HUB MOTOR ASSEMBLY AND GARDEN TOOL

(71) Applicant: Greenworks (Jiangsu) Co., Ltd., Changzhou (CN)

(72) Inventors: Yuexun Cao, Changzhou (CN); Zhiyuan Li, Changzhou (CN); Naixin Gao, Changzhou (CN); Tao Wang, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 203 days.

(21) Appl. No.: 18/450,380

(22) Filed: Aug. 15, 2023

(65) Prior Publication Data

US 2024/0092159 A1  Mar. 21, 2024

(30) Foreign Application Priority Data

Sep. 16, 2022 (CN) .......................... 202211132231.9
Sep. 16, 2022 (CN) .......................... 202222464228.9

(51) Int. Cl.
  *B60K 7/00* (2006.01)
  *B60K 17/04* (2006.01)
  *F16H 1/28* (2006.01)

(52) U.S. Cl.
  CPC .......... *B60K 7/0007* (2013.01); *B60K 17/046* (2013.01); *F16H 1/28* (2013.01)

(58) Field of Classification Search
  CPC .......... B60K 7/0007; B60K 2007/0038; B60K 2007/0092; B60K 17/046; F16H 1/28; B60L 2220/44; H02K 1/22; H02K 21/22; H02K 7/116
  See application file for complete search history.

(56) References Cited

U.S. PATENT DOCUMENTS

| | | | | |
|---|---|---|---|---|
| 8,336,282 B2* | 12/2012 | Messina | ................ | B60L 3/0061 56/320.1 |
| 8,633,622 B2* | 1/2014 | Chamberlin | .............. | F16H 3/44 310/83 |
| 2008/0070736 A1* | 3/2008 | Yoshino | ............... | B60K 7/0007 301/6.5 |

(Continued)

FOREIGN PATENT DOCUMENTS

| CN | 216078154 U | 3/2022 |
|---|---|---|
| CN | 114598098 A | 6/2022 |

(Continued)

*Primary Examiner* — Farhana Pervin

(57) ABSTRACT

A hub motor assembly includes a traveling wheel, an outer rotor motor and a deceleration mechanism. An inside of the traveling wheel is provided with an inner ring gear, the outer rotor motor is arranged inside the traveling wheel, and an outside of the outer rotor motor is provided with an outer ring gear. The deceleration mechanism includes a planetary carrier and at least one planetary gear, and the planetary carrier is arranged between the traveling wheel and the outer rotor motor. The planetary gear is rotatably mounted on the planetary carrier, and the planetary gear is internally meshed with the outer ring gear and externally meshed with the inner ring gear. The outer rotor motor drives the planetary gear to rotate through the outer ring gear, and the planetary gear drives the inner ring gear to rotate and then drives the traveling wheel to rotate.

13 Claims, 11 Drawing Sheets

(56) References Cited

U.S. PATENT DOCUMENTS

| | | | |
|---|---|---|---|
| 2009/0166112 A1* | 7/2009 | Yoshino | B60K 7/0007 |
| | | | 180/65.51 |
| 2013/0012350 A1* | 1/2013 | Ebner | B60K 7/0007 |
| | | | 475/149 |
| 2013/0049439 A1* | 2/2013 | Yamada | B60B 27/0057 |
| | | | 301/6.5 |
| 2014/0011620 A1* | 1/2014 | Munster | B60K 7/0007 |
| | | | 475/149 |
| 2014/0049094 A1* | 2/2014 | Cho | H02K 7/116 |
| | | | 301/6.5 |
| 2018/0001958 A1 | 1/2018 | Liang | |
| 2018/0015823 A1* | 1/2018 | Wu | B60K 7/0007 |
| 2020/0373806 A1* | 11/2020 | Nam | H02K 21/22 |
| 2021/0031615 A1* | 2/2021 | Li | B60T 1/062 |
| 2021/0094413 A1* | 4/2021 | Kim | B60K 17/046 |
| 2021/0153432 A1* | 5/2021 | Xu | A01D 34/6806 |
| 2022/0200392 A1* | 6/2022 | Iwata | H02K 7/083 |

FOREIGN PATENT DOCUMENTS

| | | | | |
|---|---|---|---|---|
| WO | 2014044198 A1 | 3/2014 | | |
| WO | WO-2020125587 A1 * | 6/2020 | | B60K 7/0007 |

* cited by examiner

HUB MOTOR ASSEMBLY AND GARDEN TOOL

CROSS REFERENCE TO RELATED APPLICATION

The present application claims the priority of the following Chinese patent applications: serial No. CN 202211132231.9, filed Sep. 16, 2022, and serial No. CN 202222464228.9, filed Sep. 16, 2022; the disclosure of which is hereby incorporated by reference herein in its entirety for all purposes.

TECHNICAL FIELD

The disclosure belongs to a field of garden tool, and in particular relates to a hub motor assembly and a garden tool.

BACKGROUND

With the rapid development of new energy vehicle technology, hub motors are used more and more widely. At present, the hub motors on the market mainly include inner rotor hub motors and outer rotor hub motors. The inner rotor hub motor works in high-speed working conditions, its output torque is large, and its climbing performance is good, which can ensure that the vehicle may obtain a large stable torque when running at a low speed. However, due to the need to connect the deceleration mechanism with the motor rotor, a lateral length of the inner rotor hub motor increases, which is not conducive to an effective use of the overall space. Outer rotor hub motors have higher output torque and output power. However, the output torque of outer rotor hub motors at low speed is small, and the power of the motor needs to be increased to solve it, so that the volume of the motor will be larger, which takes up a lot of space and weigh.

Therefore, it is necessary to provide a hub motor assembly to improve the above problems.

SUMMARY

The disclosure provides a hub motor assembly and a garden tool, to solve the problems that the inner rotor hub motor occupies a large space and the outer rotor hub motor has a small output torque at low speed.

The disclosure provides the hub motor assembly. The hub motor assembly includes a traveling wheel, an outer rotor motor and a deceleration mechanism. An inside of the traveling wheel is provided with an inner ring gear, the outer rotor motor is arranged inside the traveling wheel, and an outside of the outer rotor motor is provided with an outer ring gear. The deceleration mechanism includes a planetary carrier and at least one planetary gear, and the planetary carrier is arranged between the traveling wheel and the outer rotor motor. The planetary gear is rotatably mounted on the planetary carrier, and the planetary gear is internally meshed with the outer ring gear and externally meshed with the inner ring gear. The outer rotor motor drives the planetary gear to rotate through the outer ring gear, and the planetary gear drives the inner ring gear to rotate and then drives the traveling wheel to rotate.

In an embodiment of the disclosure, the traveling wheels includes a hub and a tire, the tire is mounted on the hub, a mounting cavity is arranged in the hub, and the inner ring gear is fixedly mounted on a side wall of the mounting cavity.

In an embodiment of the disclosure, the planetary carrier is in a cylindrical structure, a side wall of the planetary carrier is provided with a mounting groove corresponding to a number of the planetary gears, and the planetary gear is rotatably mounted in the mounting groove through a needle roller and a pin shaft.

In an embodiment of the disclosure, the planetary carrier is arranged in the mounting cavity of the hub, and is rotatably connected with the hub through a bearing.

In an embodiment of the disclosure, an outside of the bearing is further provided with an oil seal, and the oil seal is mounted between the hub and the bearing.

In an embodiment of the disclosure, the outer rotor motor is arranged inside the planetary carrier, the outer rotor motor includes a coaxially arranged stator and an outer rotor, the stator is fixedly connected with the planetary carrier, the outer rotor is rotatably connected with the planetary carrier, and the outer ring gear is arranged on an outside of the outer rotor and rotates synchronously with the outer rotor.

In an embodiment of the disclosure, a lead wire is connected with the stator, and a power supply is connected with the stator through the lead wire to drive the outer rotor to rotate.

In an embodiment of the disclosure, a first end of the planetary carrier is provided with a first fixed plate, the first fixed plate is fixedly mounted on the planetary carrier, and the stator is fixedly connected with the first fixed plate.

In an embodiment of the disclosure, the traveling wheel further includes a wheel cover, and the wheel cover is arranged on an outside of the hub and fixed on the hub through a fastener.

In an embodiment of the disclosure, the hub motor assembly further includes a second fixed plate, the second fixed plate includes a plate body and a plate body flange fixedly connected with the plate body, the plate body is fixedly connected with the planetary carrier, and the plate body flange is fixedly connected with a frame of a vehicle.

In an embodiment of the disclosure, a first end of the plate body facing the planetary carrier is provided with a stepped hole, the stepped hole includes a first-step hole and a second-step hole, the second-step hole is arranged inside the first-step hole and communicates with the first-step hole, the first-step hole is configured to accommodate the planetary carrier, and the second-step hole is configured to accommodate the outer rotor motor.

In an embodiment of the disclosure, the tire is detachably connected with the hub.

In an embodiment of the disclosure, a surface of the tire is provided with an anti-skid structure, and the anti-skid structure includes several anti-skid protrusions distributed at intervals along a circumferential direction of a working surface of the tire.

The disclosure further provides the garden tool. The garden tool includes a frame, a working assembly, a battery assembly and the hub motor assembly. The hub motor assembly includes a traveling wheel, an outer rotor motor and a deceleration mechanism. An inside of the traveling wheel is provided with an inner ring gear, the outer rotor motor is arranged inside the traveling wheel, and an outside of the outer rotor motor is provided with an outer ring gear. The deceleration mechanism includes a planetary carrier and at least one planetary gear, and the planetary carrier is arranged between the traveling wheel and the outer rotor motor. The planetary gear is rotatably mounted on the planetary carrier, and the planetary gear is internally meshed with the outer ring gear and externally meshed with the inner ring gear. The outer rotor motor drives the planetary gear to rotate through the outer ring gear, and the planetary gear drives the inner ring gear to rotate and then drives the traveling wheel to rotate.

In an embodiment of the disclosure, the garden tool is a mower or a snow thrower.

In the hub motor assembly of the disclosure, the outer rotor motor and the deceleration mechanism are mounted in the traveling wheels, and power of the outer rotor motor is transmitted to the traveling wheels by the deceleration mechanism to drive the traveling wheels to walk. The hub motor assembly of the disclosure has characteristics of high torque output, and may output a high torque at a low speed of the motor. At the same time, an overall structure is small in size and occupies a small space, which may be completely mounted in the hub of the traveling wheel, which is more widely used in a field of new energy vehicles.

The inner ring gear is arranged in the hub of the traveling wheel, the outer ring gear is arranged outside of the outer rotor motor, and the outer ring gear of the outer rotor motor is configured as a sun gear of a planetary deceleration mechanism to drive the planetary gear to rotate. When the planetary gear rotates, it drives the inner ring gear meshed with it to rotate, thereby driving the wheel hub to rotate and realizing the rotation of the traveling wheel. This structure can not only realize a transmission function of the planetary deceleration mechanism, but also simplify an overall structure of the hub motor and reduce an occupied space.

BRIEF DESCRIPTION OF THE DRAWINGS

In order to explain technical solutions of embodiments of the disclosure more clearly, the following will briefly introduce drawings used in a description of the embodiments. Obviously, the drawings in the following description are only some embodiments of the disclosure. For those of ordinary skill in the art, other drawings may be obtained based on these drawings without creative work.

DETAILED DESCRIPTION

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the disclosure. It should be noted that, the following embodiments and the features in the embodiments can be combined with each other without conflict. It should further be understood that the terms used in the examples of the disclosure are used to describe specific embodiments, instead of limiting the protection scope of the disclosure. The test methods that do not indicate specific conditions in the following examples are usually in accordance with conventional conditions, or conditions recommended by each manufacturer.

It should be noted that the terms such as "upper", "lower", "left", "right", "middle" and "one" cited in this specification are only for the convenience of description and are not used to limit the scope of the disclosure. The change or adjustment of the relative relationship should also be regarded as the applicable scope of the disclosure without substantial change in the technical content.

Please refer to FIG. 1 through FIG. 18. The disclosure provides a hub motor assembly and a garden tool, to solve the problems that the inner rotor hub motor occupies a large space and the outer rotor hub motor has a small output torque at low speed.

Figure 1:
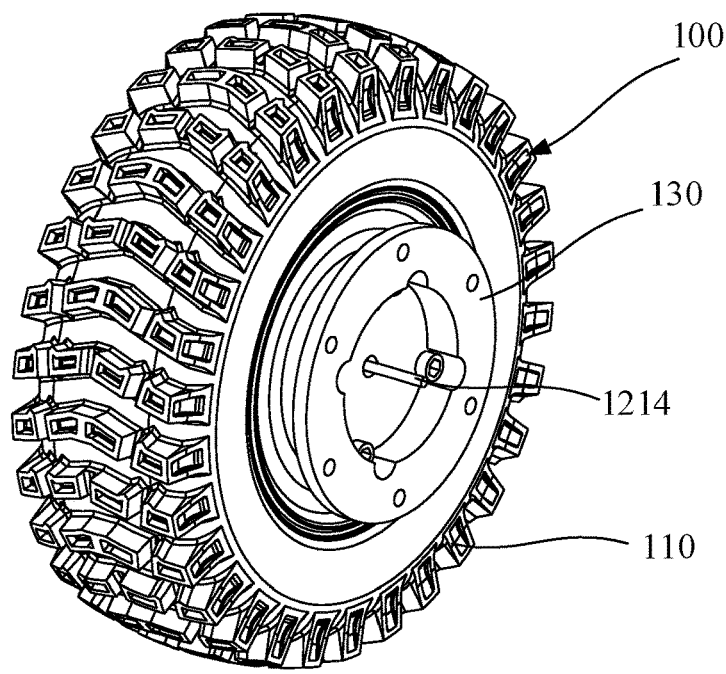
FIG. 1 is a structural schematic view of a hub motor assembly according to an embodiment of the disclosure.
Figure 2:
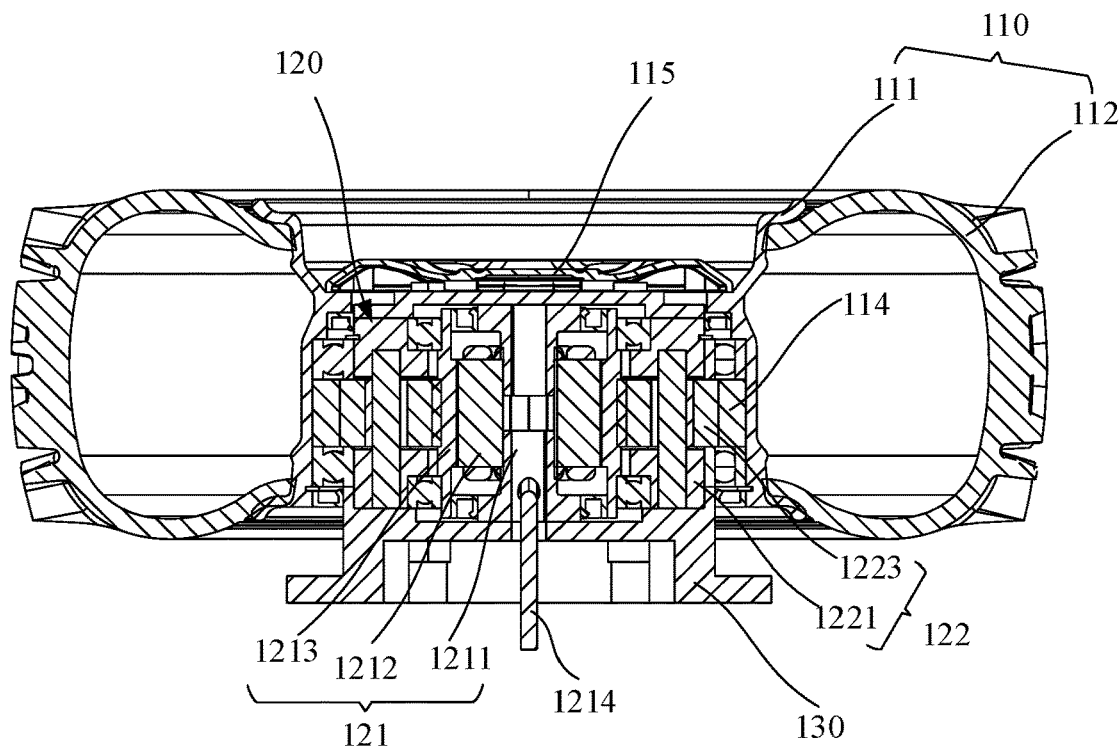
FIG. 2 is a sectional view of the hub motor assembly according to an embodiment of the disclosure.
Figure 3:
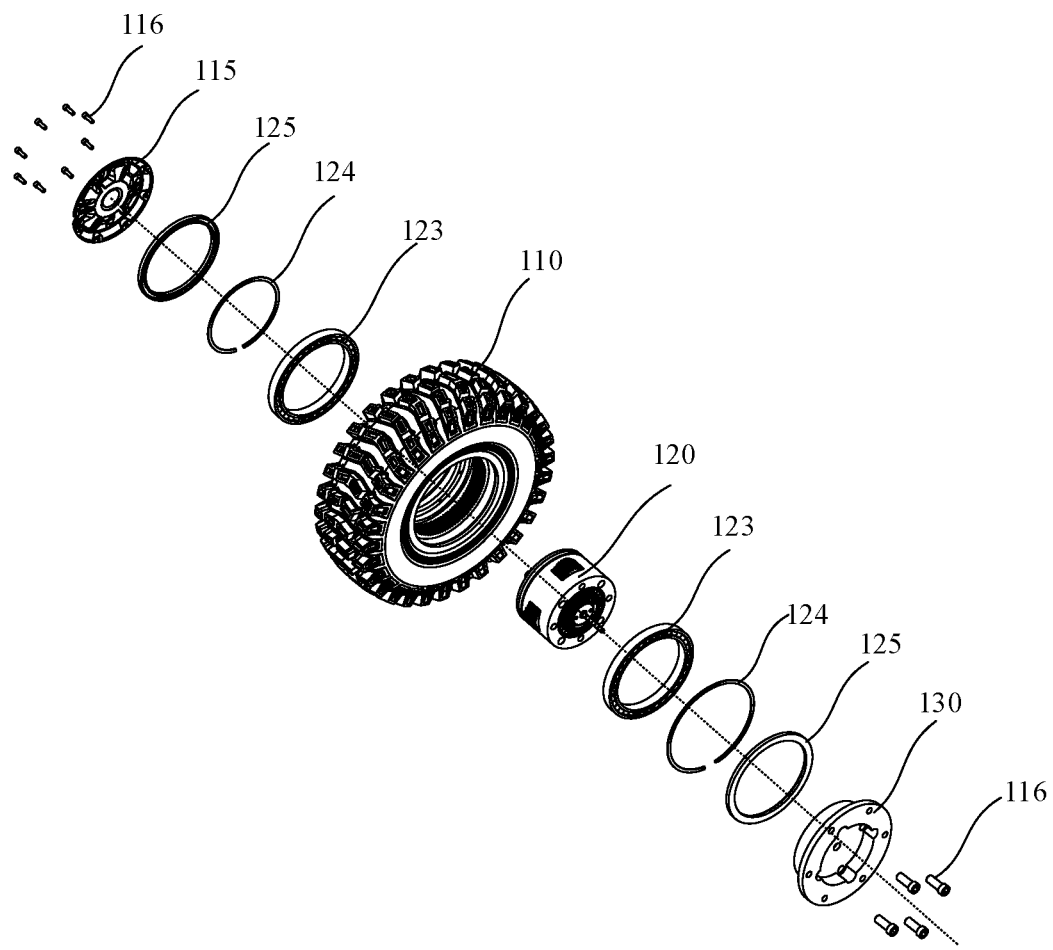
FIG. 3 is an exploded view of the hub motor assembly according to an embodiment of the disclosure.

Please refer to FIG. 1 through FIG. 3. The hub motor assembly 100 includes a traveling wheel 110 and a driving device 120. The driving device 120 is mounted inside the traveling wheel 110 and drives the traveling wheel 110 to rotate. The driving device 120 includes an outer rotor motor 121 and a deceleration mechanism 122. The deceleration mechanism 122 is arranged between the traveling wheel 110 and the outer rotor motor 121, and the outer rotor motor 121 drives the traveling wheel 110 to rotate through the deceleration mechanism 122. An inside of the traveling wheel 110 of the disclosure is provided with an inner ring gear 114, and an outside of the outer rotor motor 121 is provided with an outer ring gear 1213. The deceleration mechanism 122 includes a planetary carrier 1221 and at least one planetary gear 1223. The planetary carrier 1221 is arranged between the traveling wheel 110 and the outer rotor motor 121, the planetary gear 1223 is rotatably mounted on the planetary carrier 1221. The planetary gear 1223 is externally meshed with the inner ring gear 114 inside the traveling wheel 110, and is internally meshed with the outer ring gear 1213 outside the outer rotor motor 121. The outer ring gear 1213 on the outside of the outer rotor motor 121 drives the planetary gear 1223 to rotate, and a rotation of the planetary gear 1223 drives the inner ring gear 114 on the inside of the traveling wheel 110 to rotate, thereby driving the traveling wheel 110 to rotate. The outer rotor motor 121 of the disclosure drives the traveling wheels through the deceleration mechanism 122, which may effectively increase an output torque. A use of the outer ring gear 1213 on the outside of the outer rotor motor 121 as a sun gear of the deceleration mechanism 122 simplifies a structure of the deceleration mechanism and saves occupied space.

Please refer to FIG. 2, FIG. 4 through FIG. 6. In an embodiment, the traveling wheel 110 includes a hub 111 and a tire 112. The tire 112 is mounted on the hub 111, and the tire 112 is mostly made of rubber, which will easily lead to serious wear of the tire 112 after long-term use and affect a stability of the traveling wheel 110. Therefore, the tire 112 and the hub 111 are preferably detachably connected to facilitate a replacement of the tire 112. For example, two sides of the hub 111 are provided with a snap groove, and the tire 112 is provided with a snap tongue matched with the snap groove. The tire 112 is detachably connected with the hub 111 through a matching of the snap groove and the snap tongue. Of course, in other embodiments, the tire 112 and the hub 111 may also adopt other detachable connection methods, such as clipping, buckling, etc. Here, there is no limitation on the connection method between the tire 112 and the hub 111. Further, an anti-skid structure 1121 is arranged on a working surface of the tire 112 (a surface in contact with a ground or a working platform) to prevent the traveling wheels 110 from slipping during walking. The anti-skid structure 1121 may be, for example, several anti-skid protrusions 11211 arranged at intervals along a circumferential direction of the tire 112. A gap between two adjacent anti-skid protrusions 11211 forms an anti-skid groove 11212. Each anti-skid protrusion 11211 includes a first protrusion 11213 in a middle of the working surface of the tire 112 and second protrusions 11214 on both sides of the first protrusion 11213. The first protrusion 11213 and the second protrusions 11214 are arranged at intervals along a width direction of the working surface of the tire 112, and the first protrusion 11213 and the second protrusions 11214 are formed into a V-shaped protrusion structure. Preferably, surfaces of the first protrusion 11213 and the second protrusion 11214 are provided with pits 11215, which may increase a friction between the tire 112 and the ground on the one hand, and have a certain aesthetic quality on the other hand. Of course, in other embodiments, other structural forms of the anti-skid structure 1121 may also be used.

Please refer to FIG. 2, FIG. 4 through FIG. 6. The hub 111 is provided with a mounting cavity 113 and the mounting cavity 113 is configured to receive the driving device 120, and the inner ring gear 114 is arranged on a side wall of the mounting cavity 113. The inner ring gear 114 is fixedly connected with the hub 111 for example, by welding, fixing by fasteners or integrally formed on the hub 111, so that the inner ring gear 114 and the hub 111 are enabled to rotate synchronously. The deceleration mechanism 122 and the outer rotor motor 121 are mounted in the mounting cavity 113 inside the hub 111. The outer rotor motor 121 drives the hub 111 to rotate through a coupling of the planetary gear 1223 of the deceleration mechanism 122 and the inner ring gear 114.

Figure 7:
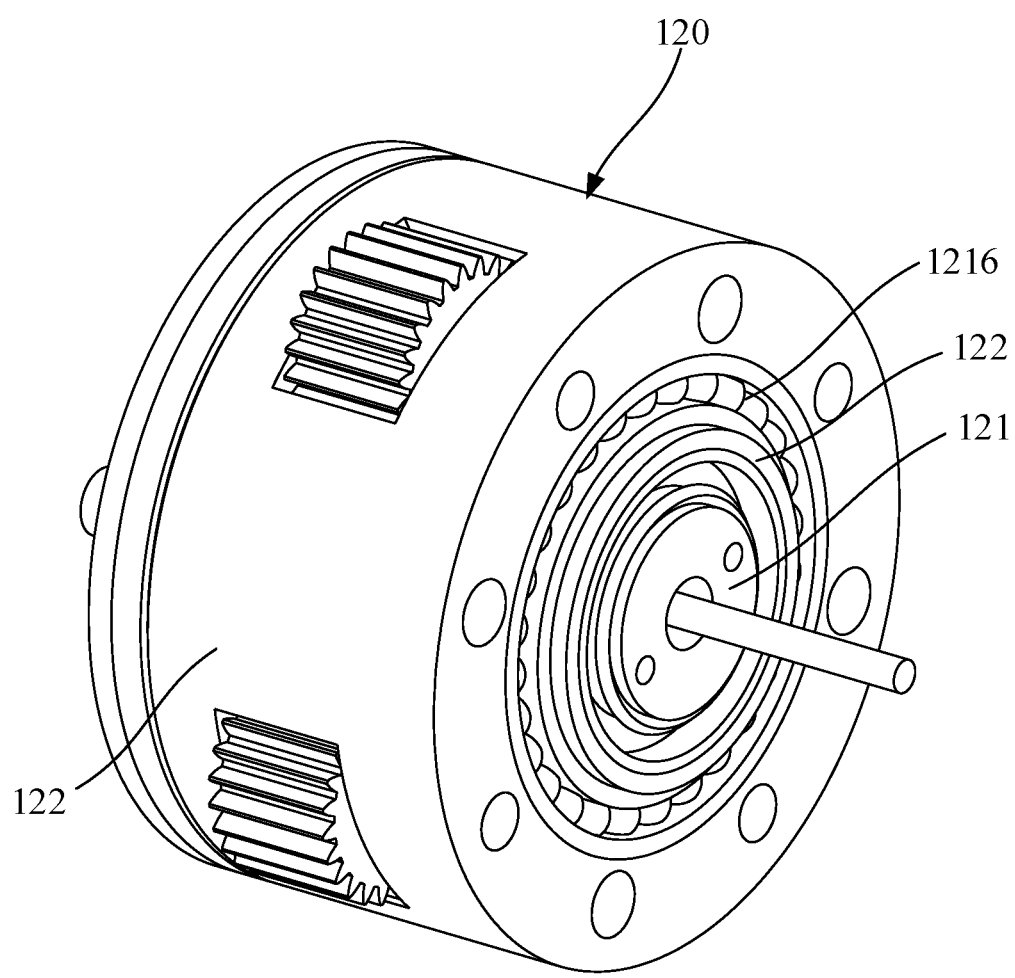
FIG. 7 is a schematic structural view of a driving device of the hub motor assembly according to an embodiment of the disclosure.
Figure 8:
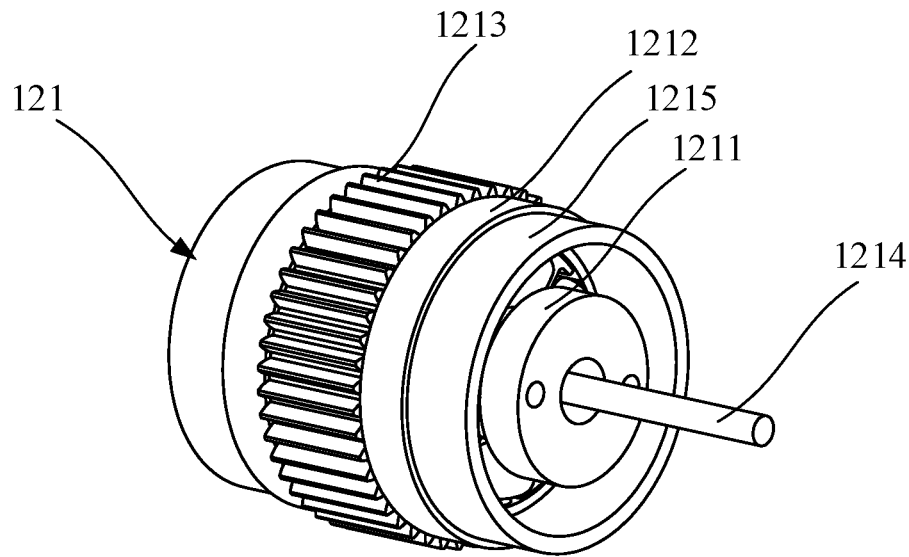
FIG. 8 is a schematic structural view of an outer rotor motor of the hub motor assembly according to an embodiment of the disclosure.

Please refer to FIG. 2, FIG. 7 and FIG. 8. In one embodiment, the outer rotor motor 121 includes a stator 1211 and an outer rotor 1212. The stator 1211 is connected with a lead wire 1214, and the outer rotor 1212 is mounted on an outside of the stator 1211 and coaxially arranged with the stator 1211. The stator 1211 is electrically connected with an external power source through the lead wire 1214 to realize a rotation of the outer rotor 1212. The outer ring gear 1213 is arranged on an outside of the outer rotor 1212 and is fixedly connected with the outer rotor 1212, for example, by welding, being fixedly connected by a fastener, or the outer ring gear 1213 and the outer rotor 1212 being in an integrated structure, which may ensure that a rotation of the outer rotor 1212 drives the outer ring gear 1213 to rotate synchronously.

Figure 9:
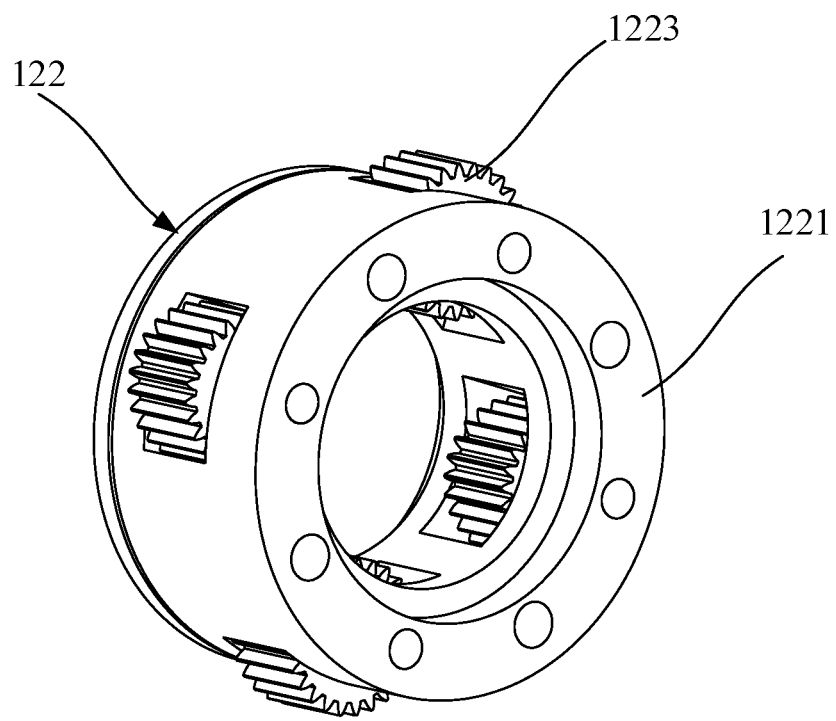
FIG. 9 is a schematic structural view of a deceleration mechanism of the hub motor assembly according to an embodiment of the disclosure.
Figure 10:
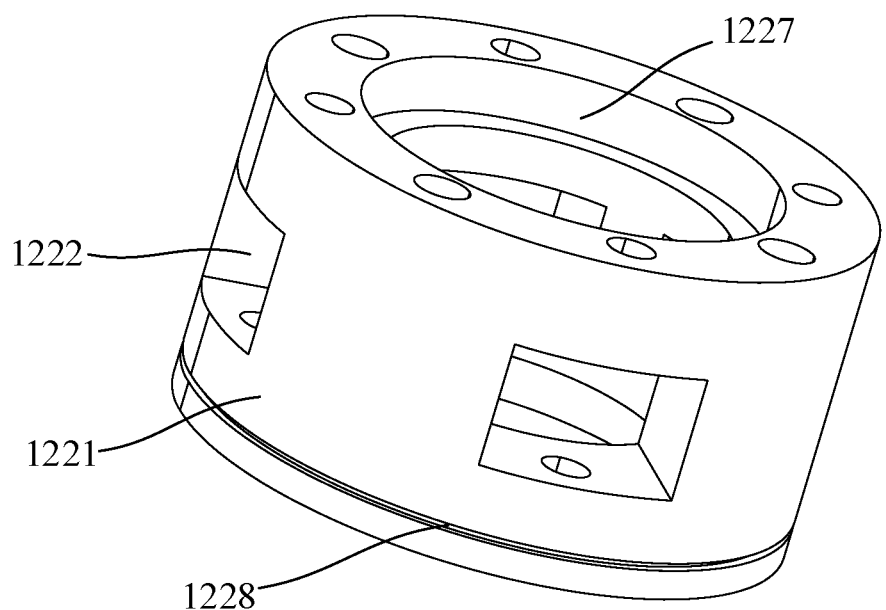
FIG. 10 is a schematic structural view of a planetary carrier of the deceleration mechanism of the hub motor assembly according to an embodiment of the disclosure.
Figure 11:
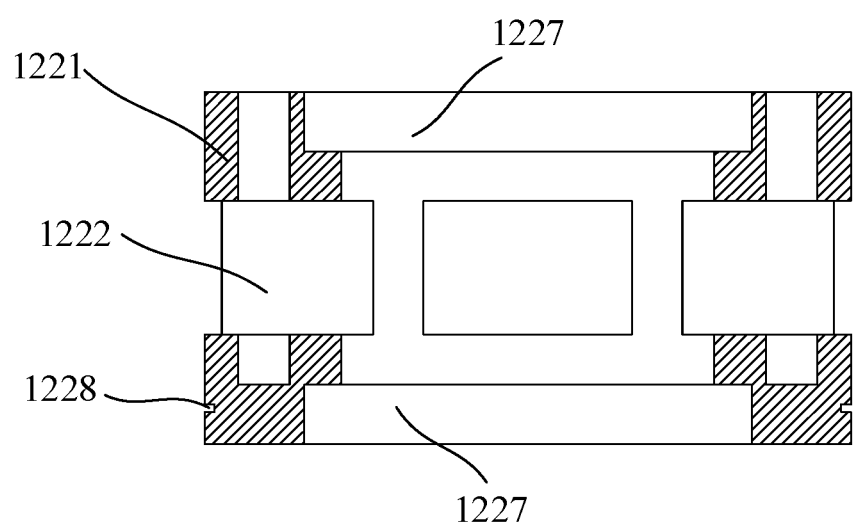
FIG. 11 is a schematic cross-sectional view of the planetary carrier of the hub motor assembly according to an embodiment of the disclosure.
Figure 12:
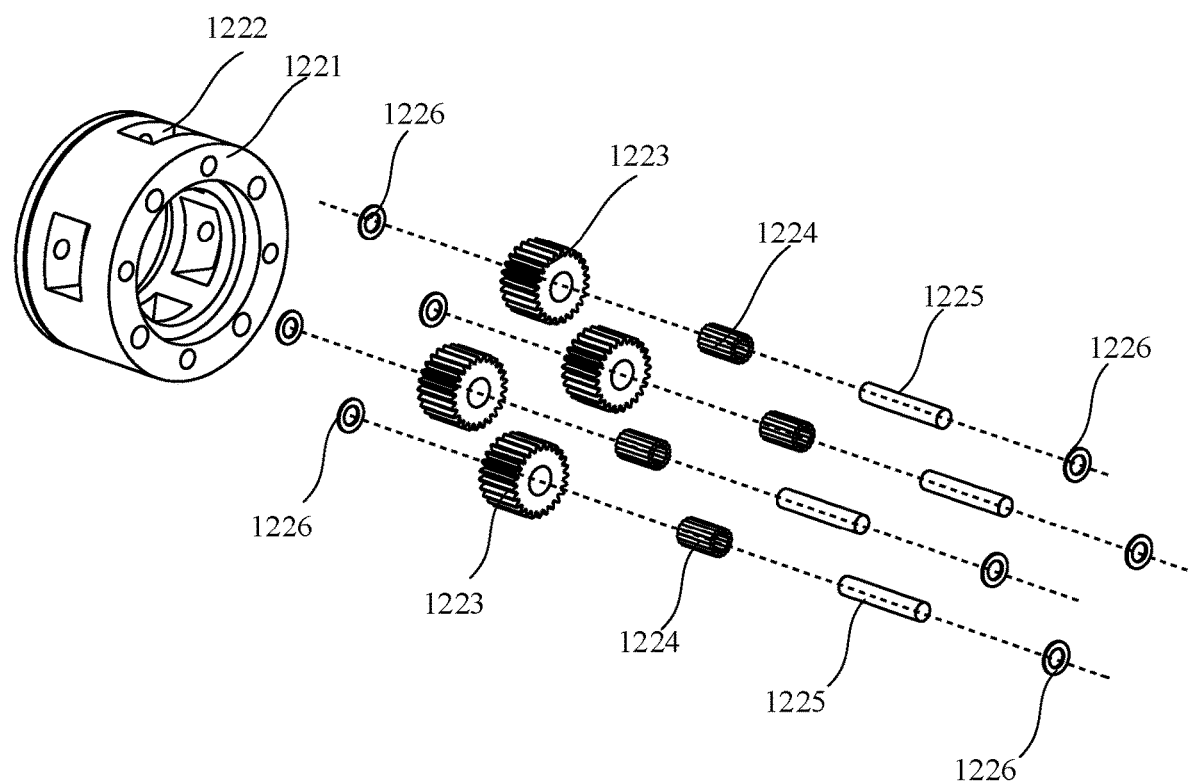
FIG. 12 is an exploded view of the deceleration mechanism of the hub motor assembly according to an embodiment of the disclosure.
Figure 13:
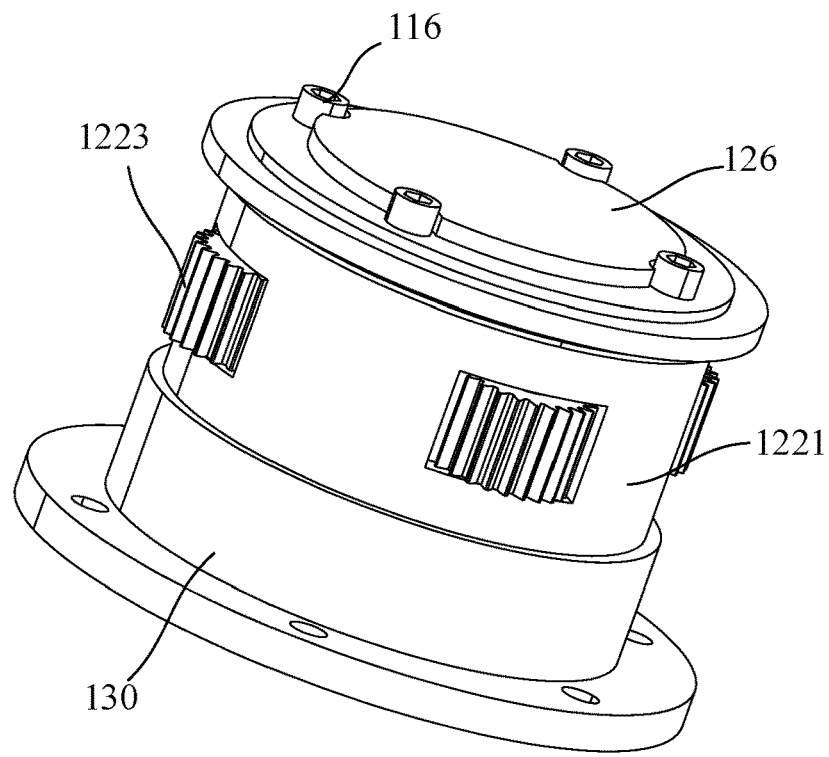
FIG. 13 is a schematic view of an assembly of the deceleration mechanism and the outer rotor motor of the hub motor assembly according to an embodiment of the disclosure.
Figure 14:
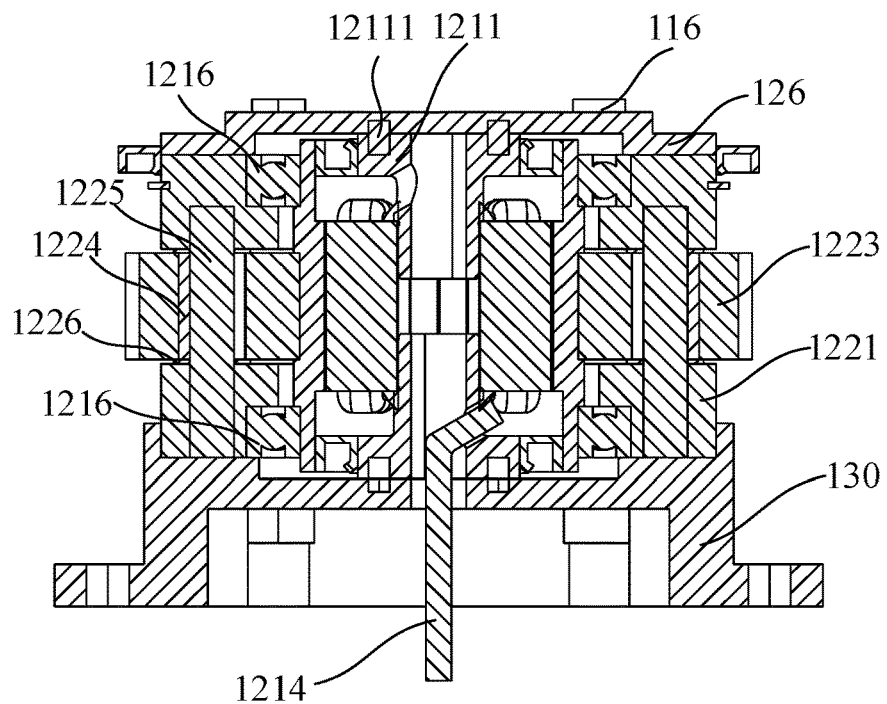
FIG. 14 is a schematic cross-sectional view of FIG. 13.
Figure 15:
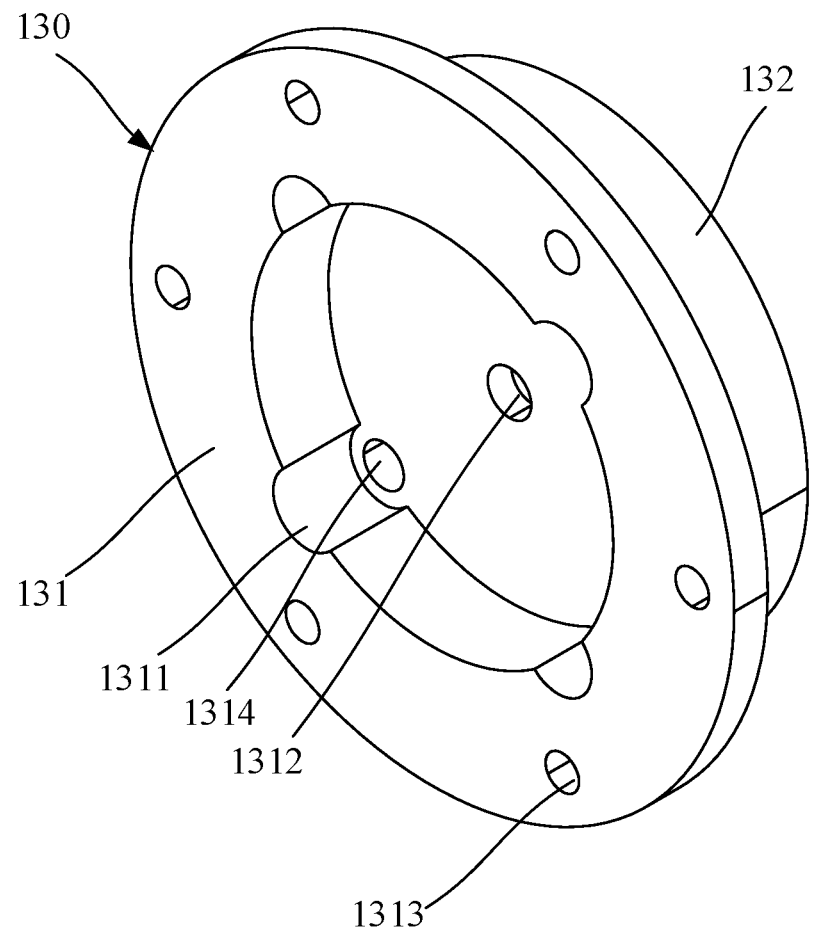
FIG. 15 is a schematic structural view of a fixed plate of the hub motor assembly according to an embodiment of the disclosure.
Figure 16:
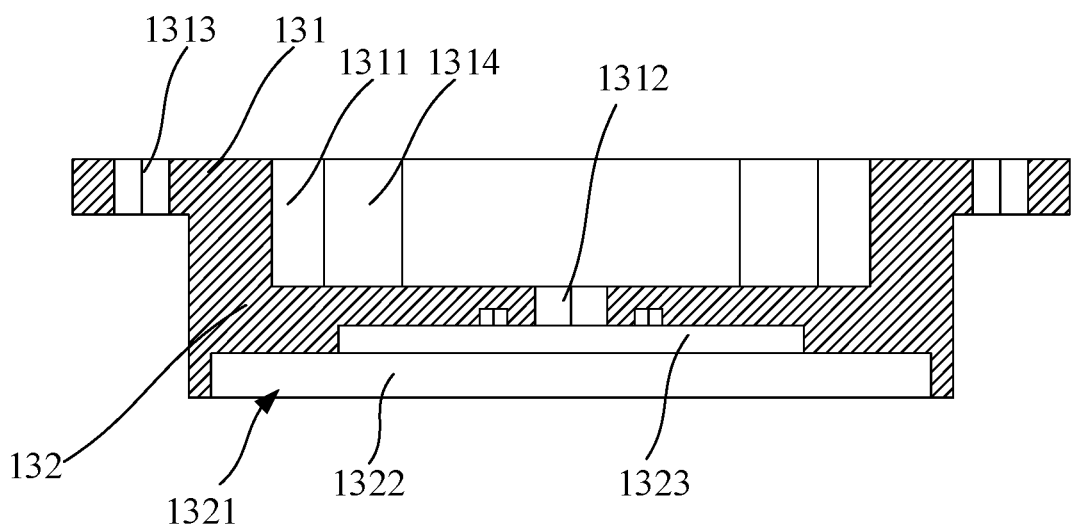
FIG. 16 is a schematic cross-sectional view of the fixed plate of the hub motor assembly according to an embodiment of the disclosure.

Please refer to FIG. 7, FIG. 8 and FIG. 9. The deceleration mechanism 122 is a planetary deceleration mechanism. The planetary carrier 1221 of the deceleration mechanism 122 is arranged between the hub 111 and the outer rotor motor 121, and the planetary gear 1223 is rotatably mounted on the planetary carrier 1221. The planetary gear 1223 may be arranged with one or more, preferably, planetary gear 1223 is arranged with multiple. A plurality of planetary gears 1223 are distributed on the planetary carrier 1221 according to a working principle of a planetary gear train, which means that a plurality of planetary gears 1223 are rotatably mounted on the planetary carrier 1221, the plurality of planetary gears 1223 are respectively internally meshed with the outer ring gear 1213 of the outer rotor motor 121, and the plurality of planetary gears 1223 are respectively externally meshed with the inner ring gear 114 inside the hub 111.

Please refer to FIG. 9 through FIG. 12. In an embodiment, the planetary carrier 1221 is a cylindrical structure, and both ends of the cylindrical structure are open. A side wall of the cylindrical structure is provided with a mounting groove 1222 of the planetary gear 1223, and the mounting groove 1222 runs through the side wall of the planetary carrier 1221, so that the planetary gear 1223 meshes with the outer ring gear 1213 on the outer rotor motor 121 on the inside. The planetary gear 1223 meshes with the inner ring gear 114 on the hub 111 on the outside. The planetary gears 1223 are rotatably mounted in the mounting grooves 1222 in a one-to-one correspondence. For example, the planetary gear 1223 is rotatably mounted in the mounting groove 1222 through a needle roller 1224 and a pin shaft 1225 respectively. Specifically, a center of the planetary gear 1223 is provided with a first through hole coupled with the needle roller 1224, and a center of the needle roller 1224 is provided with a second through hole coupled with the pin shaft 1225. Both ends of the mounting groove 1222 along an axial direction of the planetary gear 1223 are provided with connecting holes for coupling the pin shaft 1225. When assembling, the needle roller 1224 is assembled in the first through hole of the planetary gear 1223, the pin shaft 1225 is assembled in the second through hole of the needle roller 1224, and both ends of the pin shaft 1225 are respectively fixed in the connecting holes at the two ends of the mounting groove 1222 through gaskets 1226. It should be noted that a number of mounting grooves 1222 arranged on the planetary carrier 1221 corresponds to a number of planetary gears 1223 one by one. For example, the deceleration mechanism 122 includes four planetary gears 1223, and the side wall of the planetary carrier 1221 is provided with four mounting grooves 1222 at intervals along the circumferential direction. The four planetary gears 1223 are mounted in the four mounting grooves 1222 of the planetary carrier 1221 correspondingly.

Please refer to FIG. 2, FIG. 3, FIG. 8, FIG. 10, FIG. 13, and FIG. 14. When the hub motor assembly 100 of the disclosure is assembled, the outer rotor motor 121 is first assembled inside the deceleration mechanism 122. The outer rotor 1212 of the outer rotor motor 121 is rotatably connected with the planetary carrier 1221 of the deceleration mechanism 122, the stator 1211 is fixedly connected with the planetary carrier 1221, and the outer ring gear 1213 on the outside of the outer rotor 1212 meshes with the planetary gear 1223 on the planetary carrier 1221 to form the driving device 120. As an example, the outer rotor 1212 is rotatably connected with the planetary carrier 1221 through a bearing, where the bearing is denoted as a first bearing 1216. Specifically, out surfaces of both ends of the outer rotor 1212 are respectively depressed radially inward, forming a groove lower than an outer surface of a middle part, which is denoted as the first groove 1215. An inside of the planetary carrier 1221 is provided with a second groove 1227 corresponding to a position of the first groove 1215. The first bearing 1216 is sleeved on the outside of the outer rotor 1212 and supported between the first groove 1215 and the second groove 1227. In this way, a rotation connection between the outer rotor 1212 and the planetary carrier 1221 is realized. One end of the planetary carrier 1221 is provided with a first fixed plate 126. The first fixed plate 126 is fixed on the planetary carrier 1221 by a fastener 116, such as bolts, so as to encapsulate the outer rotor motor 121 inside the planetary carrier 1221. One end of the stator 1211 facing the first fixed plate 126 is provided with an axial protrusion 12111, the first fixed plate 126 is provided with a groove matched with the axial protrusion 12111, and the stator 1211 is fixed on the first fixed plate 126 through a matching between the axial protrusion 12111 and the groove, so as to achieve a fixed connection with the planetary carrier 1221.

Please refer to FIG. 2, FIG. 3, FIG. 7 and FIG. 10. The driving device 120 is assembled in the mounting cavity 113 of the hub 111, the planetary carrier 1221 is rotatably connected with the hub 111, and the planetary gear 1223 on the planetary carrier 1221 meshes with the inner ring gear 114 in the mounting cavity 113 on the outside. For example, an outside of the planetary carrier 1221 is rotatably connected with the hub 111 through a bearing, and the bearing is denoted as the second bearing 123 here. Specifically, the second bearing 123 is sleeved on an outside of an end of the planetary carrier 1221 and supported on the planetary gear 1223. The second bearing 123 is fixed in the planetary carrier 1221 or in the mounting cavity 113 by a snap spring 124. For example, a clamping groove 1228 matched with the snap spring 124 is arranged on a corresponding position on a side wall of the planetary carrier 1221 or the mounting cavity 113. The snap spring 124 is inserted into the clamping groove 1228 and abuts against an end of the second bearing 123 to limit an axial movement of the second bearing 123. In this embodiment, one of the snap springs 124 at both ends is mounted on the planetary carrier 1221, and the other one of the snap springs 124 is mounted on the side wall of the mounting cavity 113 of the hub 111, which means that one clamping groove 1228 is arranged at one end of the planetary carrier 1221, and the other clamping groove 1228 is also arranged at the other end of the hub 111 opposite to an end where the clamping groove 1228 is arranged on the planetary carrier 1221. In some embodiments, an oil seal 125 is arranged on an outside of the second bearing 123, and the oil seal 125 is arranged between the end of the second bearing 123 and the mounting cavity 113 for sealing lubricating oil inside the second bearing 123 and preventing the lubricating oil from leaking.

Figure 4:
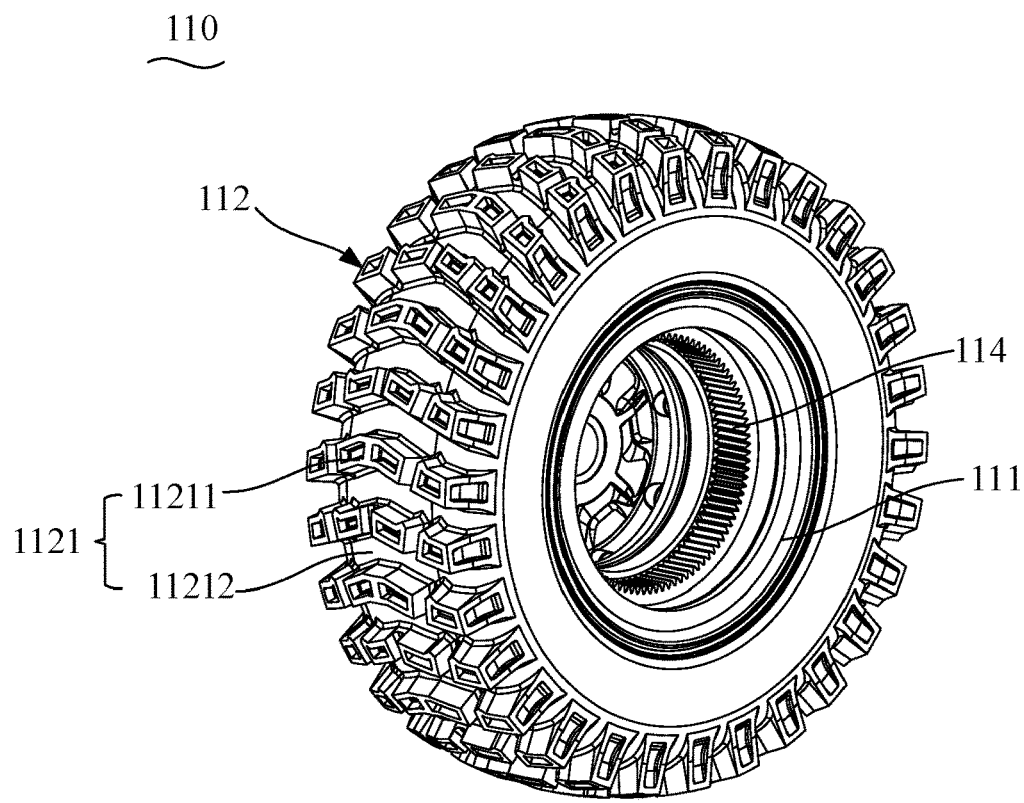
FIG. 4 is a schematic view of an engagement between a traveling wheel and an inner ring gear of the hub motor assembly according to an embodiment of the disclosure.
Figure 5:
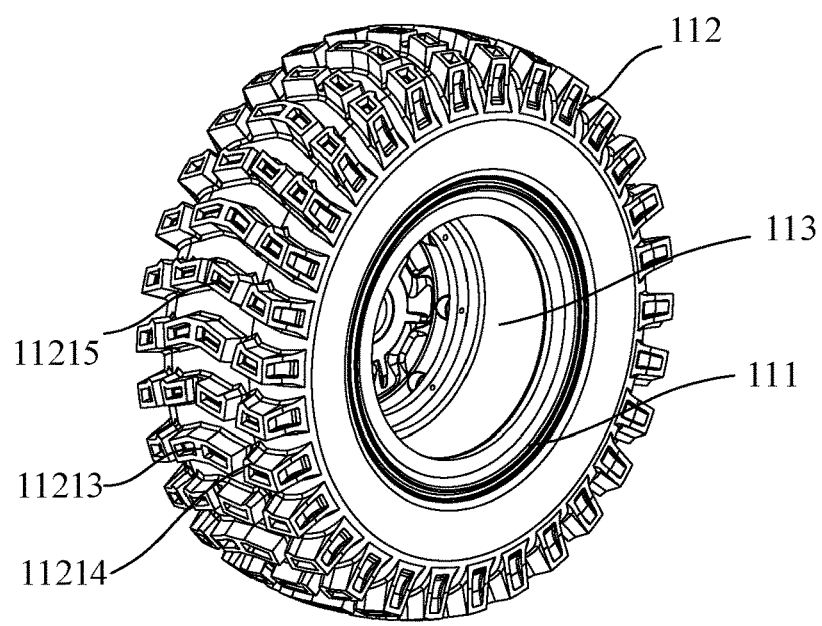
FIG. 5 is a schematic structural view of the traveling wheel of the hub motor assembly according to an embodiment of the disclosure.
Figure 6:
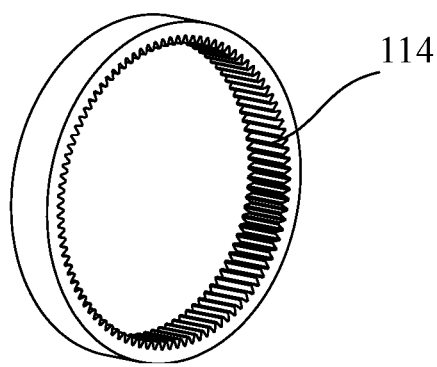
FIG. 6 is a schematic structural view of the inner ring gear of the hub motor assembly according to an embodiment of the disclosure.

Please refer to FIG. 3 and FIG. 4. In an embodiment, the traveling wheel 110 further includes a wheel cover 115. The wheel cover 115 is fixed on an outside of the hub 111 by the fastener 116, such as bolts, for blocking the driving device 120 in the mounting cavity 113 of the hub 111. Specifically, the wheel cover 115 is a disc-shaped structure with a diameter larger than an inner diameter of the mounting cavity 113. An outer edge of the wheel cover 115 is provided with a plurality of connecting holes at intervals along the circumferential direction, and a corresponding position of the hub 111 is provided with a plurality of connecting holes. Bolts pass through the connecting holes of the wheel cover 115 and the connecting holes on the hub 111 from an outside of the wheel cover 115 to be fixed on the hub 111. Preferably, several reinforcing ribs are arranged inside the wheel cover 115 to enhance a strength of the wheel cover 115.

Please refer to FIG. 1 through FIG. 3, FIG. 14 through FIG. 16. In an embodiment, the hub motor assembly 100 further includes a second fixed plate 130. The second fixed plate 130 is arranged at one end opposite to the first fixed plate 126, the second fixed plate 130 is fixed on the planetary carrier 1221 by the fastener 116 such as a fastening bolt, and the second fixed plate 130 is used to connect the hub motor assembly 100 with a frame of a vehicle. Specifically, the second fixed plate 130 includes a plate body flange 131 and a plate body 132, and the plate body flange 131 is arranged at one end of the plate body 132 and is fixedly connected with the plate body 132. Of course, the plate body 132 and the plate body flange 131 may also be in an integrated structure. An outer diameter of the plate body flange 131 is greater than an outer diameter of the plate body 132, the plate body 132 is used to connect with the planetary carrier 1221, and the plate body flange 131 is used to connect with the frame of the vehicle, and then realize a connection between the hub motor assembly 100 and the frame of the vehicle. Specifically, a plurality of first connecting holes 1313 connected with the frame of the vehicle are arranged on an outer edge of the plate body flange 131 in the circumferential direction, a plurality of second connecting holes 1314 connected with the planetary carrier 1221 are arranged on the outer edge of the plate body 132, and the second fixed plate 130 is respectively connected with the planetary carrier 1221 and the frame of the vehicle through the fasteners, such as bolts. The plate body flange 131 is provided with a relief groove 1311 at a position corresponding to the second connection hole 1314, and the relief groove 1311 may be, for example, in an arc-shaped groove structure. The relief groove 1311 may provide space for the fastener connecting the plate body 132 and the planetary carrier 1221. A middle part of the plate body 132 is provided with a through hole 1312 for the lead wire 114 of the stator 1211 to pass through. The lead wire 114 passes through the through hole of the plate body 132 to be connected with an external power source, so as to supply power for the outer rotor motor 121. When the second fixed plate 130 is mounted, the plate body 132 is arranged towards the planetary carrier 1221. In some embodiments, one end of the plate body 132 facing the planetary carrier 1221 is provided with a stepped hole 1321. The stepped hole 1321 includes a first stepped hole 1322 and a second stepped hole 1323 communicating with the first stepped hole 1322. The first stepped hole 1322 is located at the end of the plate body 132, and its hole diameter matches an outer diameter of the planetary carrier 1221. The second stepped hole 1323 is located inside the first stepped hole 1322, and a diameter of the second stepped hole 1323 is larger than an outer diameter of the outer rotor 1212 of the outer rotor motor, and smaller than an outer diameter of the first bearing 1216 on the outside of the outer rotor 1212. A step between the first stepped hole 1322 and the second stepped hole 1323 may be used to support the first bearing 1216 at an end of the outer rotor motor 121. Since the planetary carrier 1221 is connected with the frame of the vehicle through the second fixed plate 130, when the outer rotor motor 121 starts, the planetary carrier 1221 and the stator 1211 are fixed. The outer ring gear 1213 on the outer rotor 1212 acts as the sun gear, which drives the planetary gear 1223 on the planetary carrier 1221 to rotate. Since the planetary gear 1223 meshes with the inner ring gear 114 inside the hub 111, the planetary gear 1223 drives the inner ring gear 114 to rotate, and then drives the hub 111 to rotate, so that the driving device 120 drives the traveling wheel 110 to rotate.

Figure 17:
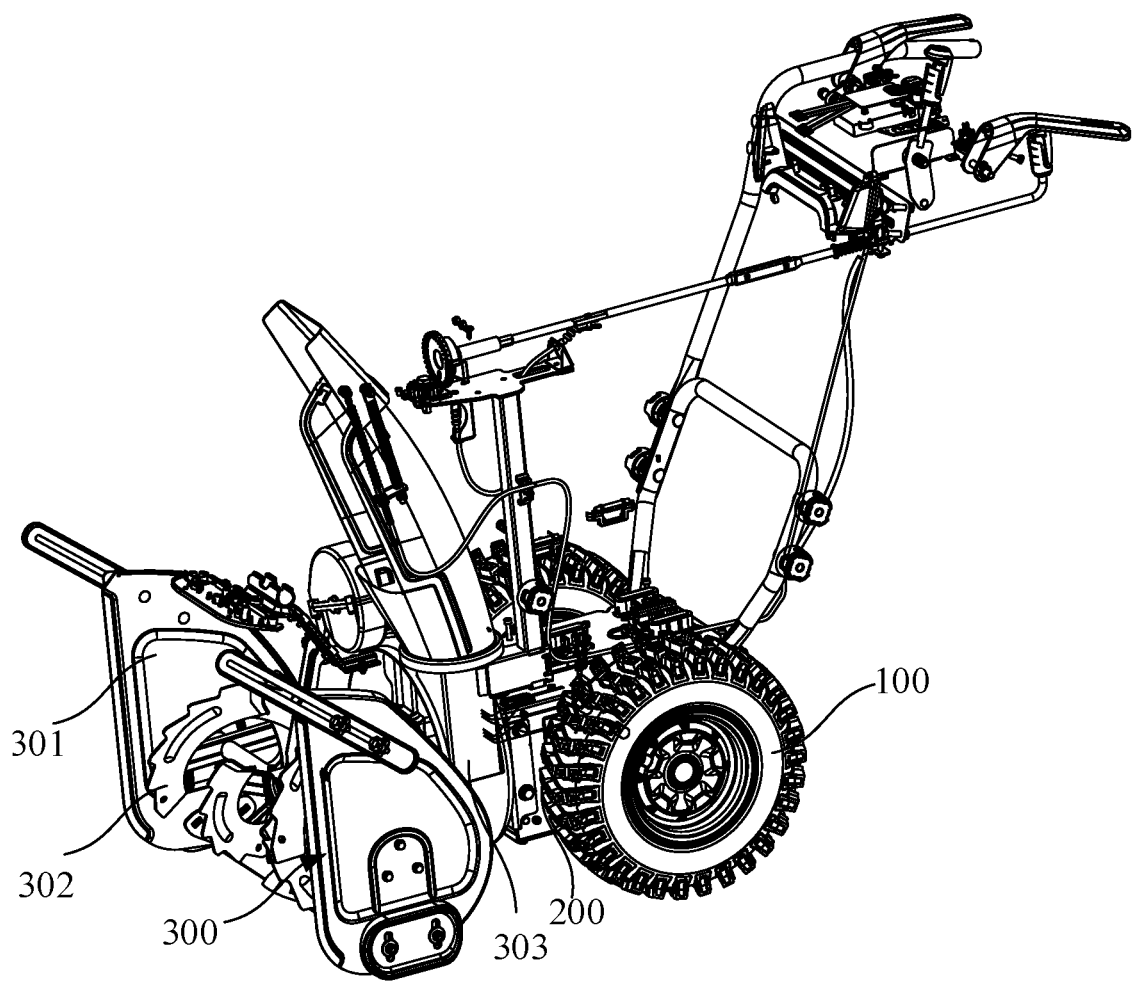
FIG. 17 is a schematic structural view of a first garden tool according to an embodiment of the disclosure.

Please refer to FIG. 17. The disclosure further provides a garden tool. The garden tool includes a frame 200, a working assembly 300, a battery assembly (not shown in the figure) and the hub motor assembly 100. The frame 200 serves as a main part of the garden tool and provides a mounting support for other components. The working assembly 300, the battery assembly and the hub motor assembly 100 are all mounted on the frame 200. The hub motor assembly 100 is used to drive the frame 200 to walk, the working assembly 300 is used for gardening work, and the battery assembly provides a power source for the working assembly 300 and the hub motor assembly 100 respectively. The hub motor assembly is the hub assembly of the disclosure, and its specific structure may be referred to the specific description above, and will not be repeated here.

Please refer to FIG. 17. In an embodiment of the garden tool of the disclosure, the garden tool is a snow thrower. The working assembly 300 of the snow thrower is a snow throwing assembly, and the snow throwing assembly is arranged on a front of the frame 200. The snow throwing assembly includes an auger housing 301, an auger 302 rotatably mounted in the auger housing 301, an impeller housing 303 communicated with the auger housing 301 and an impeller (not shown in the figure) rotatably mounted inside the impeller housing 303. When the snow thrower is working, a power assembly drives the auger 302 and the impeller to rotate, and the auger 302 rotates to collect the snow on the ground into the auger housing 301. Along with a rotation of the auger 302, accumulated snow collected in the auger housing 301 enters in the impeller housing 303, and is thrown out from a snow throwing port above the impeller housing with a rotation of the impeller.

The snow thrower includes at least two hub motor assemblies 100. The at least two hub motor assemblies 100 are respectively mounted on both sides of the frame 200. The outer rotor motors of the hub motor assemblies 100 on both sides are electrically connected with the battery assembly 300 through the lead wires 1214 of the stator 1211. The battery assembly provides power to the outer rotor motor 121 through the lead wire 1214. When the outer rotor motor 121 starts, the outer ring gear 1213 on the outer rotor acts as the sun gear and drives the planetary gear 1223 on the planetary carrier 1221 to rotate. Since the planetary gear 1223 meshes with the inner ring gear 114 inside the hub 111, the planetary gear 1223 drives the inner ring gear 114 to rotate, and then drives the hub 111 to rotate, so that the driving device 120 drives the traveling wheel 110 to rotate.

Figure 18:
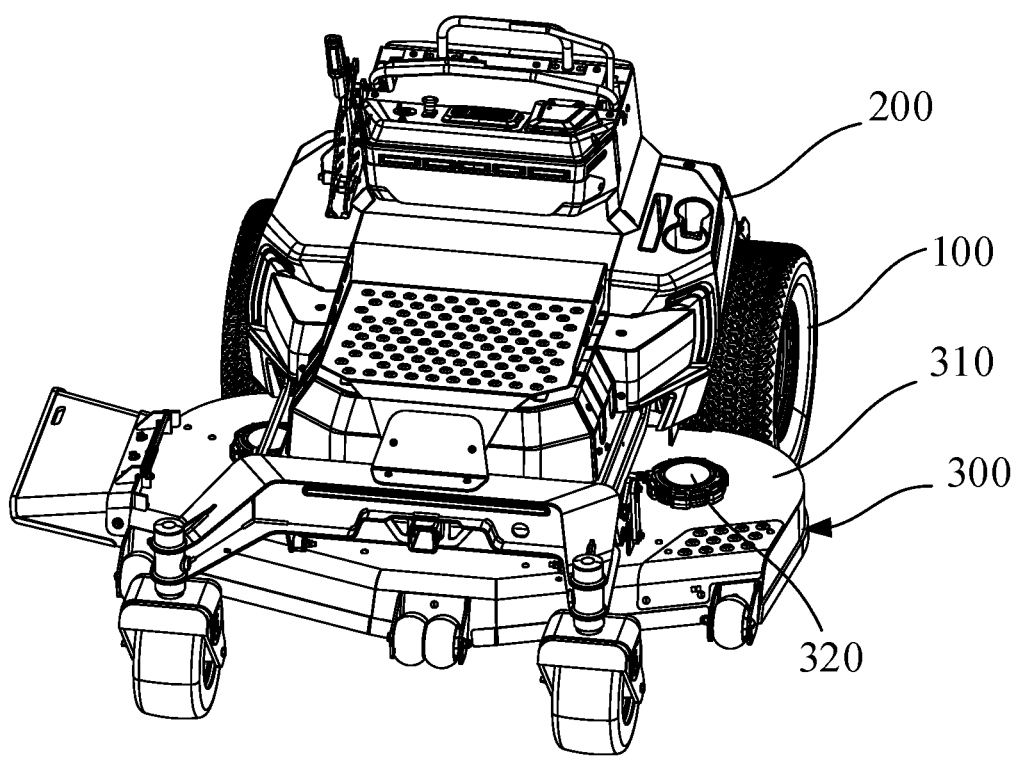
FIG. 18 is a schematic structural view of a second garden tool according to an embodiment of the disclosure.

Please refer to FIG. 18. The garden tool of the disclosure may further be a mower. The working assembly 300 of the mower is a mowing assembly. The mowing assembly includes a cutting deck 310 and a cutter assembly 320 mounted in the cutting deck 310, and the cutting deck 310 is mounted on a bottom of the frame 200. The cutter assembly 320 includes a cutter and a cutter motor. The cutting deck 310 is provided with an accommodating cavity for one or more cutter assemblies. The cutter motor is mounted in the accommodation cavity on the cutting deck 310, and the cutter is mounted on an output shaft of cutter motor and controls a rotation of the cutter by controlling the cutter motor to finish a mowing work. Similarly, the mower includes at least two hub motor assemblies 100, at least two hub motor assemblies 100 are respectively mounted on both sides of the frame 200, and the hub motor assemblies 100 on both sides of the vehicle frame 200 drive the mower to move for mowing.

The garden tool of the disclosure may also be other wheeled garden tools, such as lawn mowers, utility vehicle, etc. The working assemblies of different garden tools are different, but a structure and mounting method of the hub motor assembly are the same, and will not be repeated here.

The structures of garden tools such as mowers and snow throwers not specifically described in the disclosure may be realized by conventional technologies in the art.

In the hub motor assembly of the disclosure, the outer rotor motor and the deceleration mechanism are mounted in the traveling wheels, and power of the outer rotor motor is transmitted to the traveling wheels by the deceleration mechanism to drive the traveling wheels to walk. The hub motor assembly of the disclosure has characteristics of high torque output, and may output a high torque at a low speed of the motor. At the same time, an overall structure is small in size and occupies a small space, which may be completely mounted in the hub of the traveling wheel, which is more widely used in a field of new energy vehicles. Therefore, the disclosure effectively overcomes some practical problems in the prior art and thus has high utilization value and use significance.

The above-mentioned embodiments merely illustrate the principles and effects of the disclosure, but are not intended to limit the disclosure. Anyone skilled in the art may modify or change the above embodiments without departing from the range of the disclosure. Therefore, all equivalent modifications or changes made by those with ordinary knowledge in the technical field without departing from the range and technic disclosed in the disclosure should still be covered by the claims of the disclosure.

What is claimed is:

1. A hub motor assembly, comprising:
   a traveling wheel, an inside of the traveling wheel being provided with an inner ring gear;
   an outer rotor motor arranged inside the traveling wheel, an outside of the outer rotor motor being provided with an outer ring gear;
   a deceleration mechanism, comprising a planetary carrier and at least one planetary gear, the planetary carrier being arranged between the traveling wheel and the outer rotor motor, the planetary gear being rotatably mounted on the planetary carrier, and the planetary gear being internally meshed with the outer ring gear and externally meshed with the inner ring gear; and
   a fixed plate, comprising a plate body and a plate body flange fixedly connected with the plate body, the plate body being fixedly connected with the planetary carrier, wherein
   the outer rotor motor drives the planetary gear to rotate through the outer ring gear, the planetary gear drives the inner ring gear to rotate and then drives the traveling wheel to rotate, and the plate body flange is fixedly connected to a frame of a vehicle.

2. The hub motor assembly according to claim 1, wherein the traveling wheel comprises a hub and a tire, the tire is mounted on the hub, a mounting cavity is arranged in the hub, and the inner ring gear is fixedly mounted on a side wall of the mounting cavity.

3. The hub motor assembly according to claim 2, wherein the planetary carrier is in a cylindrical structure, a side wall of the planetary carrier is provided with a mounting groove corresponding to a number of the planetary gears, and the planetary gear is rotatably mounted in the mounting groove through a needle roller and a pin shaft.

4. The hub motor assembly according to claim 2, wherein the planetary carrier is arranged in the mounting cavity of the hub, and is rotatably connected with the hub through a bearing.

5. The hub motor assembly according to claim 4, wherein an outside of the bearing is further provided with an oil seal, and the oil seal is mounted between the hub and the bearing.

6. The hub motor assembly according to claim 4, wherein the outer rotor motor is arranged inside the planetary carrier, the outer rotor motor comprises a coaxially arranged stator and an outer rotor, the stator is fixedly connected with the planetary carrier, the outer rotor is rotatably connected with the planetary carrier, and the outer ring gear is arranged on an outside of the outer rotor and rotates synchronously with the outer rotor.

7. The hub motor assembly according to claim 6, wherein a lead wire is connected with the stator, and a power supply is connected with the stator through the lead wire to drive the outer rotor to rotate.

8. The hub motor assembly according to claim 6, wherein a first end of the planetary carrier is provided with a first fixed plate, the first fixed plate is fixedly mounted on the planetary carrier, and the stator is fixedly connected with the first fixed plate.

9. The hub motor assembly according to claim 2, wherein the traveling wheel further comprises a wheel cover, and the wheel cover is arranged on an outside of the hub and fixed on the hub through a fastener.

10. The hub motor assembly according to claim 1, wherein
a first end of the plate body facing the planetary carrier is provided with a stepped hole, the stepped hole comprises a first-step hole and a second-step hole, the second-step hole is arranged inside the first-step hole and communicates with the first-step hole, the first-step hole is configured to accommodate the planetary carrier, and the second-step hole is configured to accommodate the outer rotor motor.

11. The hub motor assembly according to claim 2, wherein
the tire is detachably connected with the hub.

12. The hub motor assembly according to claim 2, wherein
a surface of the tire is provided with an anti-skid structure, and the anti-skid structure comprises several anti-skid protrusions distributed at intervals along a circumferential direction of a working surface of the tire.

13. A garden tool, comprising:
a frame;
a working assembly, mounted on the frame;
a battery assembly, mounted on the frame;
a hub motor assembly, connected with the frame, configured to drive the frame to walk, and the hub motor assembly comprising:
a traveling wheel, an inside of the traveling wheel being provided with an inner ring gear;
an outer rotor motor arranged inside the traveling wheel, an outside of the outer rotor motor being provided with an outer ring gear;
a deceleration mechanism, comprising a planetary carrier and at least one planetary gear, the planetary carrier being arranged between the traveling wheel and the outer rotor motor, the planetary gears being rotatably mounted on the planetary carrier, and the planetary gears being internally meshed with the outer ring gear and externally meshed with the inner ring gear; and
a fixed plate, comprising a plate body and a plate body flange fixedly connected with the plate body, the plate body is fixedly connected with the planetary carrier, wherein
the outer rotor motor drives the planetary gear to rotate through the outer ring gear, the planetary gear drives the inner ring gear to rotate and then drives the traveling wheel to rotate, and the plate body flange is fixedly connected to a frame of a vehicle.

* * * * *